United States Patent [19]

Hutch

[11] 3,760,265
[45] Sept. 18, 1973

[54] OPEN CIRCUIT DETECTION APPARATUS FOR THERMOCOUPLE CIRCUITS

[75] Inventor: Frederick S. Hutch, Warminster, Pa.

[73] Assignee: Honeywell Inc., Minneapolis, Minn.

[22] Filed: May 16, 1972

[21] Appl. No.: 253,898

[52] U.S. Cl..................... 324/51, 324/111, 340/256
[51] Int. Cl............................................. G01r 31/02
[58] Field of Search ................ 324/51, 52, 73, 133, 324/111, 60 CD; 340/256

[56] References Cited
UNITED STATES PATENTS

| 3,319,157 | 5/1967 | York | 324/1 |
| 2,937,369 | 5/1960 | Newbold et al. | 324/111 X |
| 3,468,164 | 9/1969 | Sutherland | 304/51 X |
| 3,590,370 | 6/1971 | Fleischer | 324/51 |
| 3,617,886 | 11/1971 | Werme | 324/51 X |

FOREIGN PATENTS OR APPLICATIONS

| 682,934 | 3/1964 | Canada | 324/60 CD |
| 897,938 | 5/1962 | Great Britain | 324/51 |

Primary Examiner—Gerard R. Strecker
Attorney—Arthur H. Swanson et al.

[57] ABSTRACT

A circuit for detecting an open circuit condition of a thermocouple using a storage capacitor to transfer a thermocouple output signal to an analog to digital converter circuit and pulse signal means arranged to apply a pulse signal to the capacitor when the capacitor is connected to the analog to digital converter for storage by the capacitor. The stored pulse signal is subsequently discharged by a thermocouple circuit which is a complete circuit. An open-circuited thermocouple circuit will not discharge the pulse signal stored on the capacitor, and the total stored signal will accumulate during subsequent successive switching of the capacitor between the open-circuited thermocouple circuit and the analog to digital converter until a sufficient charge has been accumulated to energize an alarm signal connected to the analog to digital converter.

6 Claims, 1 Drawing Figure

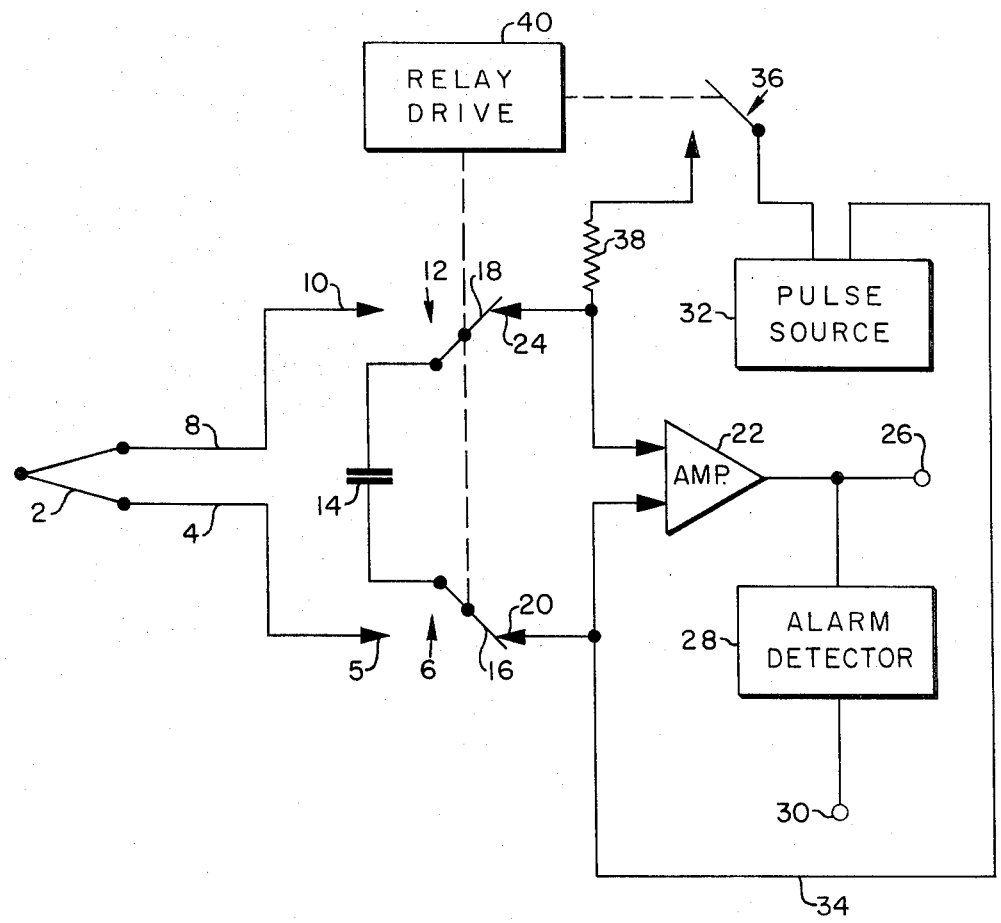

OPEN CIRCUIT DETECTION APPARATUS FOR THERMOCOUPLE CIRCUITS

This invention relates to thermocouple testing apparatus and, more specifically, to a circuit for checking either one or a plurality of thermocouple circuits to detect if any of the thermocouple circuits are open-circuited.

An object of the present invention is to provide an improved detection apparatus for detecting an open-circuit state of a thermocouple circuit.

SUMMARY OF THE INVENTION

In accomplishing this and other objects, there has been provided, in accordance with the present invention, a detection apparatus for detecting an open circuit condition of a thermocouple circuit using a storage capacitor selectively switched between a thermocouple circuit and a circuit for detecting the signal from the thermocouple. A separate source of signals is arranged to apply a signal to the capacitor when the capacitor is coupled to the detecting circuit whereby the signal from the signal source is stored on the capacitor and is subsequently discharged by a thermocouple circuit which is a complete circuit. An open-circuited thermocouple circuit will allow the charge stored on the capacitor to accumulate during successive switchings of the capacitor to the detecting circuit and an alarm circuit connected to the detecting circuit is arranged to detect the accumulation of the signal on the capacitor.

BRIEF DESCRIPTION OF THE DRAWING

A better understanding of the present invention may be had when the following detailed description is read in connection with the accompanying drawing in which the single FIGURE drawing is a circuit diagram of an open circuit detection apparatus embodying the present invention.

DETAILED DESCRIPTION

Referring to the single FIGURE drawing in more detail there is shown a thermocouple element 2 having a first connecting lead for connection to one stationary contact of a single-pole, double-throw switch 6. While mechanical relay switches have been shown in the illustration of an embodiment of the invention, it should be noted that other electrical switches, such as transistor circuits, can be used without departing from the scope of the present invention. A second connecting lead 8 of the thermocouple 2 is connected to a first stationary contact 10 of a second single-pole, double-throw switch 12. A storage capacitor 14 is connected between the movable armature 16 of the first switch 6 and the movable armature 18 of the second switch 12. A second stationary contact 20 of the first switch 6 is connected to one side of an input circuit of an amplifier 22. A second stationary contact 24 of the second switch 12 is connected to the other side of the input circuit of the amplifier 22. The output circuit of the amplifier 22 is connected to an output terminal 26 and to an alarm detector 28 having an output terminal 30. A pulse source 32 has a first output lead 34 connected to the second stationary contact 20 of the first switch 6 and a second output lead connected through a series circuit of a single-pole, single-throw switch 36 and a resistor 38 to the second stationary contact 24 of the second switch 12. A relay drive means 40 is arranged to operate the first and second switch means 6 and 12 and the third switch means 36 in a manner as hereinafter described.

MODE OF OPERATION

In operation, the relay drive means 40 is effective to transfer the movable armature 16 and 18 of the switch means 6 and 12 respectively, from the first stationary contact 5 and 10 to the second stationary contact 20 and 24. Thus, the capacitor 14 is alternately connected between the thermocouple 2 and the input to the amplifier 22. When the capacitor 14 is connected to the thermocouple 2 it is effective to store a signal therein produced by the thermocouple 2 representative of the temperature being sensed by the thermocouple 2. This stored signal is subsequently applied to the amplifier 2 to be amplified thereby to produce an output signal on an output terminal 26.

If the thermocouple 2 is in an open-circuit state whereby no signal is developed on the thermocouple output leads 4 and 8, the capacitor 14 will apply a zero level signal to the amplifier 22. However, it is desirable to detect such an open condition of the thermocouple 2 as soon as possible to prevent a malfunction of the process being monitored by the thermocouple 2. Accordingly, a pulse source 32 is arranged to apply to the capacitor 14 an auxiliary test signal for storage thereon. This storage operation is achieved by the relay drive 40 which closes the third switch 36 during the time that the capacitor 14 is connected to the second stationary contact 20 and 24 of the first and second switch means 6 and 12 respectively. This test pulse is ineffective to produce an appreciable change in the input signal to the amplifier 22 but is stored on the capacitor 14. When the capacitor 14 is, subsequently, connected to the second stationary contacts 5 and 10, an undamaged thermocouple 2 will effect a discharge of this stored signal down to a negligible level.

On the other hand, if the thermocouple 2 is in an open-circuit condition, the test signal stored on the capacitor 14 from the pulse source 32 is not discharged and is still present when the capacitor 14 is subsequently reconnected to the second stationary contact 20 and 24. Accordingly, in the case of a defective open-circuit thermocouple, the charge on the capacitor 14 is gradually built up by the successive storage of additional test signals from the pulse source 32 to an alarm signal level since the amplitude of the test signal is above the alarm signal level which is amplified by the amplifier 22 and is applied to the alarm detector 28. The alarm detector 28 is arranged to detect a large signal from the amplifier 22 which is in excess of a maximum signal representative of a thermocouple output signal. Thus, the output signal from the alarm detector 30 on the output terminal 30 is representative of an open-circuit condition of the thermocouple 2. Accordingly, the open-circuit condition of the thermocouple 2 is detected, and the output signal from the alarm detector 28 may be used to actuate any suitable alarm, e.g., a light or a recording means. Further, in the monitoring of a plurality of thermocouples, the same pulse source 32 can be used to supply a current to the individual capacitors associated with each of the thermocouples for transferring the thermocouple charge to respective ones of a plurality of amplifiers, such as amplifier 22.

Accordingly, it may be seen that there has been provided, in accordance with the present invention a detection apparatus for detecting an open-circuit condition of a thermocouple element.

The embodiments of the invention in which an exclusive property or privilege is claimed are defined as follows:

1. A circuit for detecting an open circuit state of a circuit under test comprising:
   a signal storage means,
   signal detecting means operable in response to a predetermined level of a signal stored in said signal storage means,
   switching means arranged to alternately connect said storage means between the circuit under test and said detecting means, and
   signal means arranged to supply a signal to said storage means when said storage means is connected to said detecting means, said signal having a level above the predetermined level at which said signal detecting means operatively responds and said signal storage means stores a portion of said signal during each connection of said signal storage means to said signal means by said switching means, whereby if the circuit under test is open, the signal stored on said storage means is increased by the successive storage of additional signals from said signal means until said predetermined level is reached and said signal detecting means responds to said predetermined level.

2. A circuit as set forth in claim 1 wherein said signal storage means is a capacitor.

3. A circuit as set forth in claim 2 wherein said switching means includes means arranged to connect said signal source means to said capacitor when said capacitor is connected to said signal detecting means.

4. A circuit as set forth in claim 3 wherein said switching means and said last-mentioned means are driven by a common drive means.

5. A circuit as set forth in claim 1 wherein said signal means includes a pulse signal source and a resistor in series with said pulse signal source to limit the signal transfer rate of a signal from said pulse signal source to said signal storage means.

6. A circuit as set forth in claim 2 wherein said signal means includes a pulse signal source and a resistor in series with said pulse signal source to limit the signal transfer rate of a signal from said pulse signal source to said capacitor.

* * * * *